Jan. 27, 1942.　　　　K. RABE　　　　2,270,895
SPLINED CONNECTION
Filed April 26, 1939
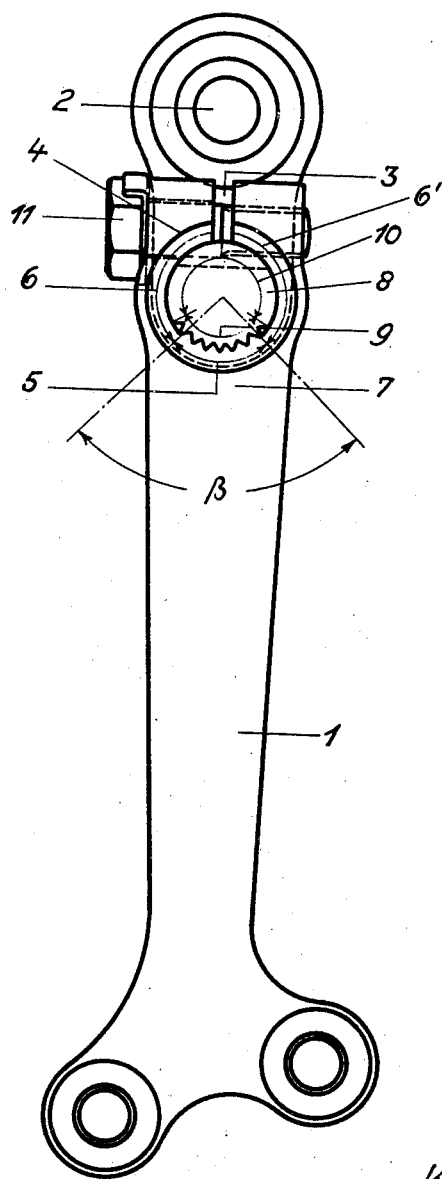
Inventor
KARL RABE
By
Attorneys Patented Jan. 27, 1942

2,270,895

UNITED STATES PATENT OFFICE 2,270,895

SPLINED CONNECTION

Karl Rabe, Stuttgart, Germany, assignor to Dr. Ing. h. c. F. Porsche K.-G., Stuttgart-Zuffenhausen, Germany, a company of Germany Application April 26, 1939, Serial No. 270,095
In Germany April 28, 1938

1 Claim. (Cl. 287—52.02)

This invention relates to a splined connection and more particularly as applied to the splining of a split hub.

An object of this invention is to provide a novel splined connection.

Another object of this invention is to provide an improved arrangement of splines in a split hub connection.

A further object of this invention is in the provision of a cheaply producible split splined connecting device.

An additional object of this invention lies in providing an improved type of connection, wherein a split hub and a trunnion are held against relative movement by cooperating splines and frictional engagement.

With the foregoing and other objects in view which will appear as the description proceeds, the invention resides in the combination and arrangement of parts and in the details of construction hereinafter described and claimed.

The invention has been illustrated in its preferred embodiment in the accompanying drawing, wherein the single figure shows a front view of the preferred form of splined connection in accordance with this invention, as applied to a steering arm and a steering arm shaft of a vehicle.

In the application of the invention shown in the single figure, is illustrated a steering arm 1 which is to be interconnected with a steering arm shaft 2. The steering arm 1 is provided with a split 3 in its hub 4, formed on one end thereof. The inner circumference of the hub 4 is shown as provided with a plurality of splines 5, here preferably illustrated as positioned substantially opposite to the split 3 and extending along the circumference of the bore for approximately an angle $\beta$, of 90°. The remaining portions 6, 6¹ of the bore of the hub 4, on either side of the split 3 are unprofiled. In order that the splines may be positioned at the point of greatest strength about the circumference of the hub, they are preferably cut on that side thereof from which the body of the arm 7 extends.

The numeral 8 indicates any shaft, bar or trunnion to which the arm 1 is to be attached, such as the trunnion pivot of the steering arm shaft 2 is also provided on one side 9 with a plurality of splines cooperating with the splines 5 in the hub 4. As illustrated, the trunnion 8 has more splines than the hub 4, thereby permitting relative adjustment between these members. The remaining portion of the trunnion 10 is formed un-splined and is accordingly in tight frictional engagement with the un-splined portion 6, 6' of the hub 4, upon tightening of the screw 11.

In split splined connections heretofore used in which the splines extended about the entire circumference of the hub and trunnion, an unequal loading upon the teeth of the spline occurred, when the split hub was tightened. The teeth near the split always assumed the greater part of the load, and as a result, were often broken and cracked, thus ruining the effect of the entire connection. In the present construction, however, by providing a relatively small number of splines, the load will be equally divided among them, particularly if positioned substantially opposite to the split. At the same time the frictional action between the un-splined portions of the hub and trunnion may be made extremely effective to form a tight rigid connection upon tightening of the split by the screw. Another advantage of the present construction over those previously used, lies in the fact that where the connection took place through splines spaced about the entire circumference, a certain amount of play was necessary in order to insure that the connection could be made. It resulted obviously in an improper division of the load among the individual teeth. In the present construction, however, the necessary play can be formed in the un-splined section of the two parts, where its effect disappears after tightening of the hub screw.

The invention also lends itself to cheap and easy manufacture of the connecting parts. By having the splines extend only about a relatively small part of the circumference, they can generally be cut in a single operation by a relatively simple machine.

While the invention is particularly adaptable for use with connecting members on a vehicle, such as, for example, as interconnecting the foot lever for the clutch with the clutch shaft or between a torsion spring and a wheel supporting link, it is obviously usable in any case where it is desired to utilize a split hub construction. Accordingly, while I have herein shown and described only a single embodiment of my present invention, it is to be understood it is merely illustrative, and that I do not intend to limit myself thereto except as may be required by the following claim.

I claim:

In combination, an arm, a split hub on said arm having a generally smooth bore provided with a plurality of splines spaced partially about the circumference of said bore in a group on the arm side of said bore and spaced from the split portion of said hub, a generally smooth trunnion in said bore having a plurality of splines extending partially about its circumference and engaging the splines in said bore, and means for tightening the smooth split portion of said hub against the smooth portion of said trunnion, whereby the interengaging splines prevent relative rotation between said arm and trunnion and the greatest part of the lateral pressure resulting from tightening of said hub is exerted upon the smooth part of the trunnion to prevent injury to said interengaging splines and permit a proper division of the load among them.

KARL RABE.